United States Patent
Sievers et al.

(10) Patent No.: US 9,225,201 B2
(45) Date of Patent: Dec. 29, 2015

(54) CONTROL UNIT FOR OPERATING A SAFETY SYSTEM FOR A VEHICLE AND METHOD FOR OPERATING SUCH A SAFETY SYSTEM FOR A VEHICLE

(75) Inventors: Falko Sievers, Reutlingen (DE); Hartmut Schumacher, Freiberg (DE); Carsten List, Walheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 560 days.

(21) Appl. No.: 13/696,112

(22) PCT Filed: Mar. 10, 2011

(86) PCT No.: PCT/EP2011/053587
§ 371 (c)(1),
(2), (4) Date: Jan. 10, 2013

(87) PCT Pub. No.: WO2011/138074
PCT Pub. Date: Nov. 10, 2011

(65) Prior Publication Data
US 2013/0106179 A1     May 2, 2013

(30) Foreign Application Priority Data

May 4, 2010 (DE) .......................... 10 2010 028 556

(51) Int. Cl.
| | |
|---|---|
| *B60L 1/00* | (2006.01) |
| *H02J 9/00* | (2006.01) |
| *B60R 21/017* | (2006.01) |
| *H02J 7/00* | (2006.01) |
| *H02J 7/34* | (2006.01) |

(52) U.S. Cl.
CPC ................. *H02J 9/00* (2013.01); *B60R 21/017* (2013.01); *H02J 7/0073* (2013.01); *H02J 7/345* (2013.01)

(58) Field of Classification Search
CPC ........... H02J 9/00; H02J 7/0073; H02J 7/345; B60R 21/017
See application file for complete search history.

(56) References Cited

U.S. PATENT DOCUMENTS

2006/0012941 A1    1/2006   Heckel et al.

FOREIGN PATENT DOCUMENTS

| CN | 1701008 A | 11/2005 |
|---|---|---|
| DE | 195 42 085 | 7/1996 |
| DE | 102 55 429 | 6/2004 |

(Continued)

OTHER PUBLICATIONS

International Search Report for PCT/EP2011/053587, dated Apr. 2, 2011.

(Continued)

*Primary Examiner* — Daniel Cavallari
(74) *Attorney, Agent, or Firm* — Kenyon & Kenyon LLP

(57) ABSTRACT

In a control device and a method for operating a safety system for a vehicle, a step-up converter is fashioned as a switching converter which converts an input voltage derived from a vehicle battery voltage into a higher charge voltage at its output. In addition, at least one energy reserve storage device is provided that is charged by the charge voltage for the operation of the safety system in an autarkic mode. Between the step-up converter and the at least one energy reserve storage device there is connected a charge current source that is programmable during operation and that defines a charge current for the at least one energy reserve storage device as a function of its programming.

8 Claims, 6 Drawing Sheets

(56) References Cited

FOREIGN PATENT DOCUMENTS

| | | |
|---|---|---|
| DE | 10 2004 057 690 | 6/2006 |
| DE | 10 2005 034294 | 1/2007 |
| DE | 10 2008 003080 | 7/2009 |
| JP | 2005-335470 | 12/2005 |

OTHER PUBLICATIONS http://cds.linear.com/docs/Datasheet/1775f.pdf, Jan. 1, 1999.

CONTROL UNIT FOR OPERATING A SAFETY SYSTEM FOR A VEHICLE AND METHOD FOR OPERATING SUCH A SAFETY SYSTEM FOR A VEHICLE

BACKGROUND OF THE INVENTION

1. Field of the Invention

The present invention relates to a control device and to a method for operating a safety system for a vehicle of the type indicated in the independent patent claims.

2. Description of the Related Art

From published German patent document DE 195 42 085 B4, a safety device for vehicle occupants is known in which a capacitor is provided for energy storage and a first voltage converter is provided that is connected to the vehicle battery and that increases the voltage of the vehicle battery to a multiple of the voltage of the vehicle battery, and charges the capacitor with this higher voltage. A second voltage converter is provided in order to be connected, via its output, to an input of a voltage stabilizer. In addition, a microcontroller that controls the voltage converters is provided and the voltage converters are capable of being controlled by a serial interface of the microcontroller. From published German patent application document DE 10 2004 057 690 A1, a device and a method are known for charging an electrical energy storage device. Here, an active current limitation is provided in a main current path in order to limit a supply current to a defined maximum. A voltage converter device is situated downstream from the current limiting device in order to raise the potential of the electrical energy storage device above a supply potential.

BRIEF SUMMARY OF THE INVENTION

In contrast, the control device according to the present invention, or the method according to the present invention for operating a safety system for a vehicle, have the advantage that there is now connected, between the step-up converter and the energy reserve storage device, a charge current source that is programmable during operation that defines a charge current for the at least one energy reserve storage device as a function of its programming. In this way, a decoupling of the energy reserve storage device from the step-up converter is possible, so that various requirements can easily be realized, such as, preferably, an energy-saving mode for the control device, in which the energy reserve storage device is not charged, but rather only the computer, and thus a microcontroller of the control device, is supplied with current and the other components are not supplied with current. That is, the airbag application is not active in such a savings mode. Nonetheless, the degree of efficiency in such a mode must be high enough that low input current values from the vehicle voltage are possible. Through this partitioning, through the use of the charge current source it is also easily possible to set the charge speed of the energy reserve storage device as required. As stated below, the situation of the charge current source between the step-up converter and the energy reserve storage device has the further advantage that the initial measurement of the capacitance of the energy reserve storage device and of the equivalent internal resistance of the energy reserve storage device can take place without additional measurement current sources, via the programmable charge current source. A capacity for rapid starting, i.e. readiness of the airbag power supply in a time of less than 5 ms without additional external components, is also made possible by the programmable charge current source. In addition, a capacitive load parallel to the energy reserve can be omitted in order to avoid risks regarding a tearing off of the energy reserve, because the programmable charge current source is now provided between the energy reserve storage device and the step-up converter. Moreover, the coupling of the energy reserve storage device to the step-up converter via the programmable charge current source ensures that a short-circuit or an increased leakage current of the energy reserve storage device does not cause a breakdown of the airbag power supply, because the step-up converter has its own output, loaded for example as described in the dependent claims with a capacitive load, and the discharge current, which is limited by the programmable charge current source, is within the capacity of the step-up converter.

In particular, as indicated above, the insertion of the programmable charge current source between the step-up converter and the energy reserve storage device means that the capacity of the energy reserve storage device can be determined automatically during the charging process. This can be achieved already for very small voltages of approximately 11 V at the energy reserve storage device, so that a possible influence of a leakage current of the energy reserve storage device is greatly reduced. The increased measurement precision results in a smaller design of the energy reserve storage device.

The programmability of the charge current source makes it possible, using the software, to redefine and activate the charge current boundary value after each power-on reset.

In the present context, a control device is to be understood as an electrical device that processes sensor signals and, as a function thereof, controls a safety system such as a passive personal protective system having airbags and safety belts. The control device standardly has its own housing made of metal and/or plastic; however, it can also be made at least partly of distributed components on different devices. Active and passive safety can be situated in a common housing.

The operation of the safety system means that the safety system is activated in a safety-relevant case for which it is designed. If, for example, there occurs an accident that makes it necessary to activate an airbag, the control device will output a control signal in order to control the corresponding airbags.

In the present context, the safety system is understood as a passive safety system such as airbags or seat belt tensioners, but also as an active safety system such as an electronic stability control of the vehicle or an anti-slip control.

A step-up converter is a standardly electronic component having an inductor that converts the input voltage to an output voltage that is increased relative to the input voltage. For this purpose, the step-up converter is fashioned as a switching converter. Such a step-up converter has for example an inductor, and therefore a coil, that is connected in series to a freewheeling diode or a freewheeling transistor that in the present case can be realized in integrated form. After the freewheeling diode there is provided a charge capacitor that sums the output voltages. The coil is connected to ground by a switch. At the coil there is an input voltage, and the current through the coil, and thus the energy stored in the magnetic field, increases. If the switch is opened, the coil attempts to maintain the flow of current. The voltage at its secondary end increases very rapidly until it exceeds the voltage at the capacitor and the diode opens. In the first moment, the current continues to flow in unmodified form and further charges the capacitor. The magnetic field breaks down and emits its energy by driving the current via the diode into the charge capacitor and to the load. Generally expressed, in the charging process the inductor acts as a load and absorbs energy, and in the discharge process the inductor acts as an energy source similar to a battery. Therefore, a distinction is made between the charge phase and the so-called freewheeling phase. In the freewheeling phase, energy is transported to the output of the step-up converter.

The input voltage derived from the vehicle battery is for example a filtered and polarity-protected voltage that is derived directly from the vehicle battery voltage.

The charge voltage at the output of the step-up converter is higher than the input voltage; this explains the term "step-up converter."

The at least one energy reserve storage device is standardly one or more capacitors that are charged with the charge voltage present at the output of the step-up converter for the operation of the safety system in an autarkic operation mode. Autarkic operation occurs when the supply to the vehicle battery is interrupted, for example as the result of an accident. The charge current source programmable during operation is standardly a current regulator. This is a transistor circuit that acts as a current valve, containing a logic unit that converts the programming into a corresponding current value. In this way, during operation, i.e. when the vehicle is switched on and the battery voltage is present, the charge current can be set as a function of the situation. This programming can for example be executed by the microcontroller in the control device. The programmable charge current source can be realized as a current mirror or as a current regulator having a shunt resistor.

In the present case, programming means that during operation the charge current source receives signals that the charge current source interprets in such a way that they yield a value for the charge current.

It is advantageous that for the programming a serial interface is provided to which a computer, for example a microcontroller in the control device, can be connected in order to carry out the programmings. Here, a recommended serial interface is the so-called SPI interface, or Serial Peripheral Interface. This interface standardly has 3+n (0 . . . 7) lines that have different signals, such as clock, Master In Slave Out (MISO), Master Out Slave In (MOSI), and n chip select lines for each connected slave module. This enables a particularly simple programming and communication in the control device. In particular, it is possible to integrate the step-up converter and the charge current source, as well as further components such as a step-down converter, in a single system ASIC, i.e. on an integrated circuit on a single substrate. The programming can also take place via an adjustable resistor or programming pins. In the case of binary levels, the programming pins correspond to the number of bits of the programming word.

It is further advantageous that at the output of the step-up converter there is connected a capacitive load for summing the outputted inductive switched currents of the step-up converter emitted via a freewheeling diode or a synchronously controlled freewheeling transistor. This capacitive load should be as small as possible. This is achievable by a converter having a high clock frequency of from 1 to 10 MHz. Target values should be in a range of from 1 to 20 µF, and should be realized by so-called Multi-Layer Ceramic Chip Capacitors (MLCC). By reducing the output capacitance of the step-up converter to these values, no further measures for starting current limiting from the onboard vehicle network are necessary (cost reduction). The starting current is limited to a few microseconds (<30 µs) and its amplitude is very strongly determined by the impedance of the on-board network. Moreover, due to this capacitive load a stable operation of the step-up converter can be achieved. This is enabled by matching the regulator to this load. In addition, direct feedback must be reliably avoided (instability). This can be improved in a targeted fashion through the use of unavoidable series resistors/inductors between the freewheeling circuit and the output capacitance (definition of the resistance/inductance of the conductor path, bonding wires between the freewheeling diode and the output capacitance), without additional costs.

In addition, it is advantageous that the control device has a logic unit that, as a function of at least one electrical parameter at the at least one energy reserve storage device, carries out an initial measurement of a capacitance of the at least one energy reserve storage device during the charging of the energy reserve storage device, and subsequently carries out a measurement of an equivalent internal resistance of the at least one energy reserve storage device. This logic unit is standardly present in the microcontroller, which reads out the necessary data via, for example, the voltage curve at the at least one energy reserve storage device. The initial measurement of the capacitance and the measurement of the internal resistance are triggered via the SPI interface and as a function thereof. In the present context, reference to "charging the at least one energy storage device" is intended to refer to the charging of the energy storage device after a switching on or powering-on of the control device.

Advantageously, the logic unit has at least one comparator for comparing the at least one electrical parameter, standardly a voltage, in the present case for example the voltage over the electrical energy reserve storage device, with a predeterminable threshold, the initial measurement of the capacitance and the measurement of the internal resistance being carried out as a function of this comparison. That is, if the voltage over the energy reserve storage device with the capacitor reaches a prespecified value, then the measurement of the capacitance is carried out. Through the use of for example two comparator values, an integrated counter, for example 10 bit/10 kHz, can be used to determine the charge time required to run through a prespecified measurement band. As a measurement current, here a standardized value of 90 mA can be used. In this way, the capacitance results according to the following equation:

$$CER = \text{measurement current} \times \text{charge time} / \text{measurement band}.$$

For the measurement of the so-called equivalent internal resistance of the energy reserve, and thus of the energy reserve storage unit, two comparator values can be used in order to determine whether the internal resistance of the energy reserve storage device is sufficiently small. For example, if there is a change in the measurement current from 90 mA to 930 mA, a change in voltage, for example 0.5 V, is realized through a comparator threshold queried 10 µs after the change in the measurement current. If this is exceeded, the internal resistance is for example <0.6 ohms. Given a change in voltage of for example 1V, a second comparator test point is queried after the application of the measurement current. If this is exceeded, the internal resistance is then more than 1.2 ohms. The sequence controlling can thus be realized in the microcontroller, but also can also be realized as hardware by logic elements in the ASIC. Likewise, the measurement device can be realized by the analog-digital converter of the microcontroller or by voltage comparators and counters in the system ASIC. The start of the measurement can be initiated by the microcontroller in the ASIC, the precise starting time taking place through the hardware when VER_min is reached. The initiation can for example take place by reading the result register of the initial capacitance. The result register is not overwritten if no measurement is carried out.

Furthermore, it is advantageous that the logic unit is fashioned in such a way that after the charging of the energy reserve storage device the logic unit can cyclically carry out a further measurement of the capacitance. For this purpose as well, a comparator threshold can be used. This measurement starts after the microcontroller reads the result register of the cyclical capacitance measurement. The charge current source is disabled by this process. The voltage decreases due to loads that are not relevant to cost, for example at a voltage divider. If the voltage over the energy reserve storage device reaches a prespecified value, the measurement current is then used to recharge the energy reserve until a further value is reached. Through the selection of a reduced measurement span and a measurement current correspondingly matched thereto, the resolution of μF to digits remains precisely at the value of the initial capacitance measurement.

In a development, it is provided that measurement errors in the measurement of the capacitance and of the internal resistance are avoided following a breakdown of the battery voltage by monitoring the input voltage using a comparator. If this voltage sinks below the value determined by the comparator, each running measurement is identified as not executable in a measurement storage device. An alternative to this is that the current controller of the charge current source produces an adjustment status in the measurement application. Only when this status, except for settling times, reaches the same response time as the measurement time itself is the running measurement to be regarded as free of interference and therefore valid. That is, the adjustment to the target current takes place immediately, and remains in this adjusted state until the end of the measurement time. Otherwise, the measurement value is given a "not executable" identifier in the measurement storage device. In order to acquire the adjustment status, a 10-bit counter having a clock frequency of 10 kHz may likewise be used. Lower resolutions are also conceivable.

In addition, it is advantageous that the charging of the at least one energy reserve storage device by the charge current source takes place in a first time segment and a third time segment with a first current level, in a second time segment with a test current, and in a fourth time segment with a second current level that is lower than the first current level, the first, second, third, and fourth time segment following one another in this sequence, and in the second time segment an initial measurement of the capacitance and of the internal resistance of the energy reserve storage device being carried out. The changeover between the first current level and the test current level, as well as between the first and the second current level, takes place on the basis of a voltage over the energy reserve storage device. That is, the voltage over the energy reserve storage device is compared to prespecified thresholds.

In addition, it is advantageous that the control device starts up in energy-saving mode. Because the step-up converter can form output voltage almost synchronously with the switching on of the control device voltage, because the energy reserve storage device or devices are not charged (charge current source remains disabled at first). Through at least one step-down converter connected to the output of the step-up converter, the computer (microcontroller) is supplied with electrical energy, i.e. in the present case an energy-saving mode is provided that reduces the discharge from the vehicle battery by advantageously using the charge current source to avoid charging the control device-internal energy storage device from the battery, or to do so only as desired (μC program, data transfer via CAN, FLEXRAY, LIN). In the step-down converter, the input voltage is converted to a lower output voltage. An advantageous realization of the step-down converter configuration is to connect two step-down converters in series, which decrease the voltage step-by-step. These two step-down converters are capacitively loaded just as much as is the step-up converter. This energy-saving mode is used for example for automobiles in showrooms, for example in that the control device receives the command to go into this energy-saving mode via a diagnostic tester. Other possibilities for the energy-saving mode are keyless entry, in which a defined state is activated without starting the actual application.

DETAILED DESCRIPTION OF THE INVENTION

Figure 1:
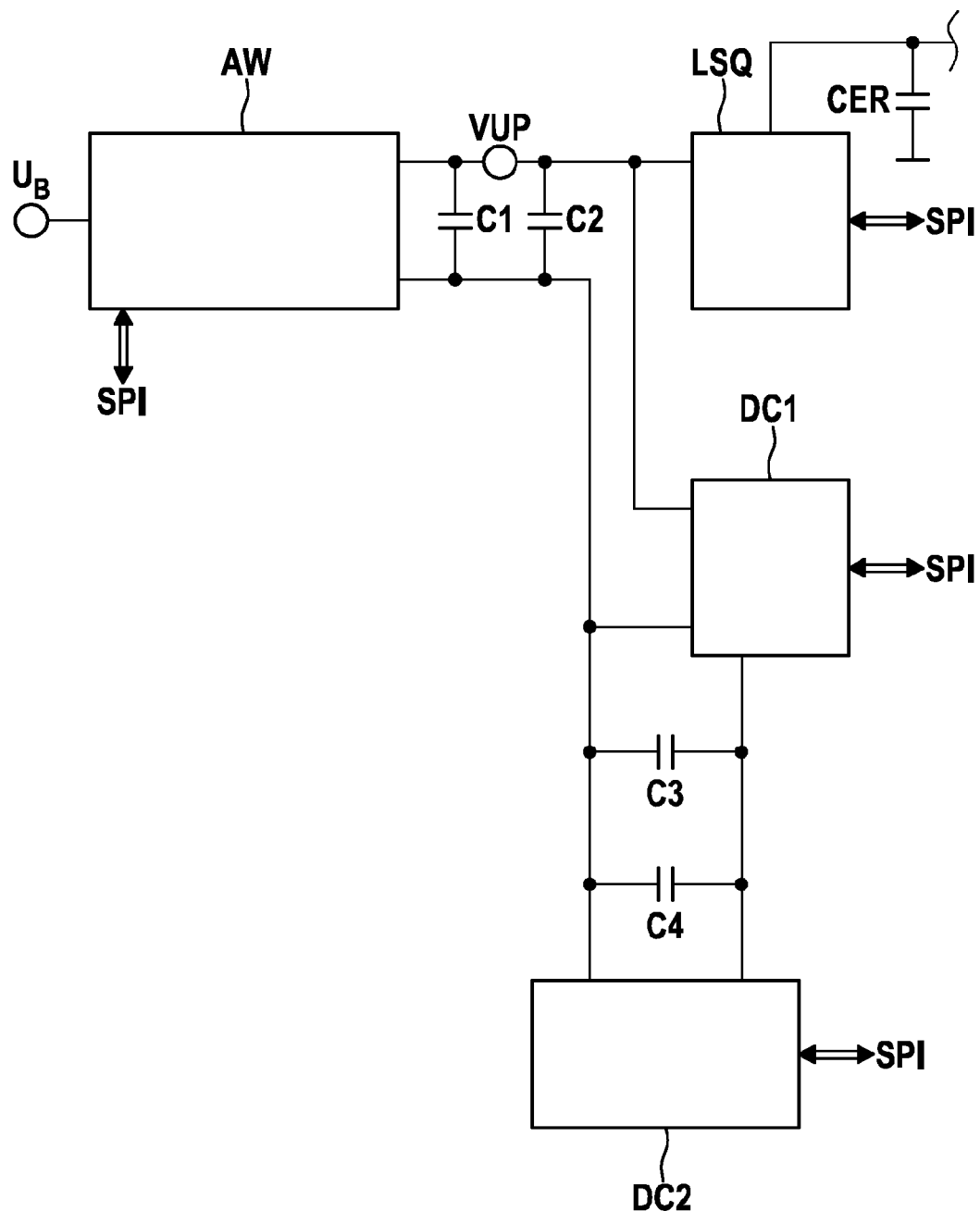
FIG. 1 shows a block diagram of the control device according to the present invention.

FIG. 1 shows a block diagram of a part of the control device that contains the present invention. Battery voltage UB is applied to the input of a step-up converter AW, for example via filters and/or a polarity protection device, so that step-up converter AW increases battery voltage UB, or the voltage derived therefrom, to a specified level. The output voltage at capacitor C1, which is connected downstream parallel to the output via a portion of a conductor path, is designated VUP. Step-up converter AW can predominantly be controlled via an SPI interface, and here primarily the following parameters can be modified: ON/OFF, clock frequency, edge steepness transistors T1, T2, current limiting T1, T2, output voltage 23 . . . 25V/31 . . . 35 V. Capacitors C1 and C2 connected in parallel at the output are in the present case so-called multi-layer ceramic chip capacitors (MLCC), having a magnitude of from 1 to 20 μF and ensuring stable operation of the step-up converter. These capacitors C1 and C2 have low impedance, but stable controlling is nonetheless achieved at the high converter frequency used in the present case, namely for example 1800 to 2200 kHz, which makes it possible to avoid interference in the medium-wave range. Through targeted, defined layout measures, the inductance load of for example 5 . . . 15 mOhm/5-10 nH per centimeter of the connection of these converter output capacitors can be used to achieve sufficient impedance values. Here, a value of 0.125 ohms for 1 cm length to 0.5 mm width to 35 μm thickness for the connection of output capacitors C1 and C2 has proven advantageous. The current outputted by the converter causes a voltage at the inductance load of C1 and C2 without a time delay, enabling a stable controlling. Step-down converters DC1 and DC2 shown in the following in FIG. 1, connected to the output of step-up converter AW in series, are situated on a common ASIC, i.e. a common integrated circuit in which the step-up converter, the two step-down converters DC1 and DC2, and also the charge current source LSQ are situated, in such a way that the output capacitor of step-up converter AW can be connected to a conductor path of 1 cm length/0.5 mm width/35 μm thickness, resulting in a resistance load to inductance of 5 . . . 15 mOhm/5-10 nH, so that the converter is generally stable. However, at the same time, using the same capacitor the function of an input buffer capacitance of the following converter, i.e. DC1 and DC2, can be achieved if this is coupled, with a small conductor path length of from 0 to 5 mm, to the input of the following converter stage. This reduces voltage ripple and radiation. This method can also be correspondingly used for the coupling of the two step-down converters DC1 and DC2.

Output voltage VUP, i.e. the charge voltage according to the claims, is used by charge current source LSQ to charge energy reserve CER connected to the output of the charge current source, i.e. the energy reserve storage device, in order to be equipped for autarkic operation. However, the firing is mostly carried out via this capacitor CER, i.e. also in the case of non-autarkic operation. The target voltage is here designated VER. Charge current source LSQ, and also step-down converters DC1 and DC2, can be controlled and programmed via serial interface SPI, preferably using the microcontroller (not shown here). With regard to charge current source LSQ, programming is necessary to determine which current is used to charge capacitor CER. Capacitor CER is standardly an electrolyte capacitor; however, other capacitor types are also possible. Likewise, the magnitude of the capacitance and of the ESR measurement current can be adjusted, as can the clock frequency of the time measurement.

Charge current source LSQ has a current controller. Such a current controller regulates the current to the programmed current that was defined by the microcontroller of the control device. With this programming of the current, it is already possible in the charge phase after the switching on of the control device to carry out an initial measurement of the capacitance and of the equivalent internal resistance of capacitor CER. This measurement is necessary in order to confirm the proper functioning of this capacitor, so that the energy reserve can also be used to trigger for example air bags or safety belt tensioners. The measurement results are advantageously stored in the control device so that will they will be available for a later confirmation of functioning.

Components that are not necessary for the understanding of the present invention but that form part of the operation of the control device have been omitted for the sake of simplicity.

The buildup speed with which capacitor CER is charged to its specified voltage can be adjusted via the setting of the charge current. Moreover, operating modes such as a power saving mode are possible in that, in such a power saving mode, the charge current source does not charge capacitor CER. The microcontroller, which is also to be operated in such a power saving mode, also referred to as eco-mode, is then supplied with the necessary energy via step-down converters DC1 and DC2, which are coupled directly to the step-up converter. By setting the charge speed of energy reserve CER, it is possible to set a specified system-ready time.

The triggering circuits are connected to energy reserve CER, so that energy reserve CER can supply energy to these circuits during activation. The other components of the control device are supplied via step-down converters DC1 and DC2 in autarkic operation.

Step-down converters DC1 and DC2 are operated at least partly in inverted fashion relative to step-up converter AW. They also each have inductors, and have the task of correspondingly converting the voltages downward. Interfaces are connected to the step-down converters in order to supply the electronics in the control device with the corresponding voltage levels. Such voltage levels are discussed in more detail below. It is possible for step-down converter DC1 not to carry out such a supplying, but rather to convert the voltage down to a first level, which is used by second voltage converter DC2, which converts it further downward. Moreover, step-down converters DC1 and DC2 are operated at least partly in inverted fashion relative to step-up converter AW. If at least one step-down converter is connected to the output of step-up converter AW, voltage VUP is reduced, and voltage VER is thus likewise reduced. If energy reserve CER is missing, or if the step-up converter is defective, the battery voltage will be reduced to the output voltage of this step-down converter. The inverted operation of the step-up and step-down converters means that the charge phase is started in the step-up converter, and the so-called freewheeling phase is then started in the step-down converter. The charge phase means that the inductor is charged and the freewheeling phase means that the energy from the inductor is outputted. Between these two phases, switching takes place in a switching converter. If step-up converter AW is in the freewheeling phase, i.e. in the phase in which energy is transported to output VUP, then energy is immediately taken from output VUP by step-down converter DC1, with a certain degree of phase coincidence. In this way, the alternating portion of the VUP control voltage is reduced, and a contribution is made that makes do with low-cost ceramic capacitors at output VUP that are as small as possible. The ceramic capacitors are capacitors C1 and C2, or, between the two step-down converters DC1 and DC2, C3 and C4.

A further step-down converter for producing a voltage of from 1.2 to 3.3 V, programmable using hardware, is connected to the output voltage of step-down converter DC1. This second step-down converter DC2 is operated in inverted fashion relative to the step-up converter, as is first step-down converter DC1. In this way, at the output of the first step-down converter, precisely at the moment of increasing output voltage a counteraction takes place by a drawing of energy through the second step-down converter. In this way, the alternating portion of the output voltage of first step-down converter DC1 is also reduced, thus supporting the reduction of the capacitance at the output of the first step-down converter, from for example 150 µF to about 30 µF.

Figure 2:
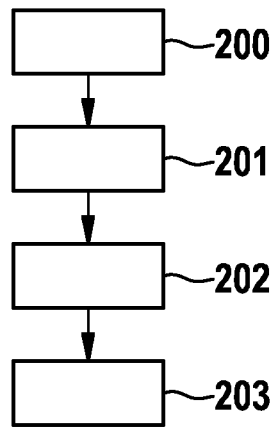
FIG. 2 shows a flow diagram of the method according to the present invention.

The flow diagram shown in FIG. 2 explains the method according to the present invention. In method step 200, battery voltage UB is for example filtered or polarity-protected, but is at least provided at the input of step-up converter AW. In method step 201, this step-up converter AW carries out the upward conversion by being operated as a switching converter. Due to this, voltage VUP is measurable at the output of step-up converter AW. Via serial interface SPI, charge current source SLQ is programmed so that, with a corresponding current, it charges capacitor CER, which is the energy reserve storage device or energy reserve or energy reserve capacitor, to voltage VER. This takes place in method step 203.

Figure 3:
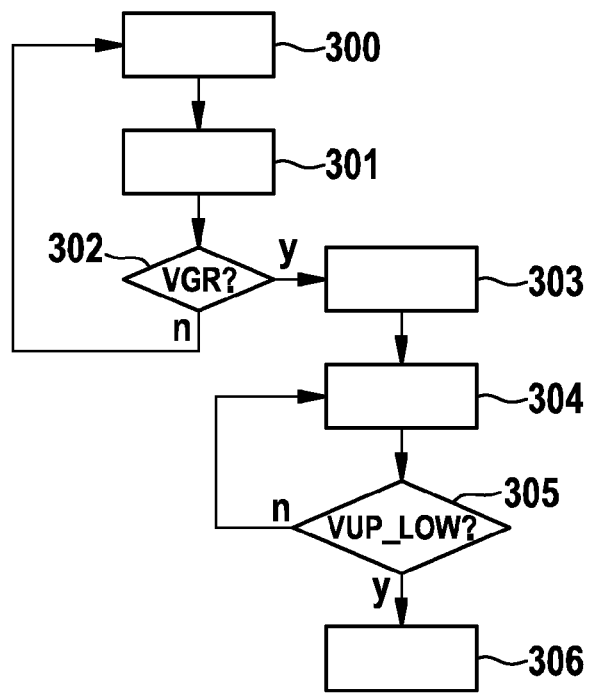
FIG. 3 shows a further flow diagram of the method according to the present invention.

FIG. 3 refines this flow diagram to form a further flow diagram, method step 203 being taken up in method step 300, and the previous method steps from FIG. 2 now no longer being executed. During the charging of the capacitor in method step 300, in method step 301 the voltage at the capacitor is measured, for example by the microcontroller or by the system ASIC, which also contains the converters themselves. In method step 302 this voltage is checked to find out whether the voltage at the capacitor has reached the threshold VER_min. If this is not the case, the method jumps back to method step 300. If, however, this is the case, then the method can either continue directly at method step 303, or can wait until a test command is outputted via SPI in order to perform an initial measurement of the capacitance of capacitor CER and of its equivalent internal resistance ESR. Subsequently, the charging is resumed in method step 304. The measurement of the capacitance, or also the measurement of internal resistance ESR, is carried out using a measurement current that may deviate from the charge current.

In method step 304, the charge current from method step 300 is again received, either automatically or as requested by microcontroller μC via serial interface SPI. In this second charge phase, in method step 305 it is checked whether the charge voltage at capacitor CER has reached the value VUP_low, which is higher than voltage VER_min. If this is not the case, the charging is continued using the charge current. If, however, it is the case, then in method step 306 the programming of charge current source LSQ is modified in such a way that now a maintenance current is used that is smaller than the charge current from method steps 300 and 304. This maintenance current is used to reach target voltage VUP and to hold the capacitor at this voltage. The step-up converter is operated with a frequency that is high enough, and is smoothed by the output capacitors in such a way, that the charge current source interprets this as a direct current.

Figure 4:
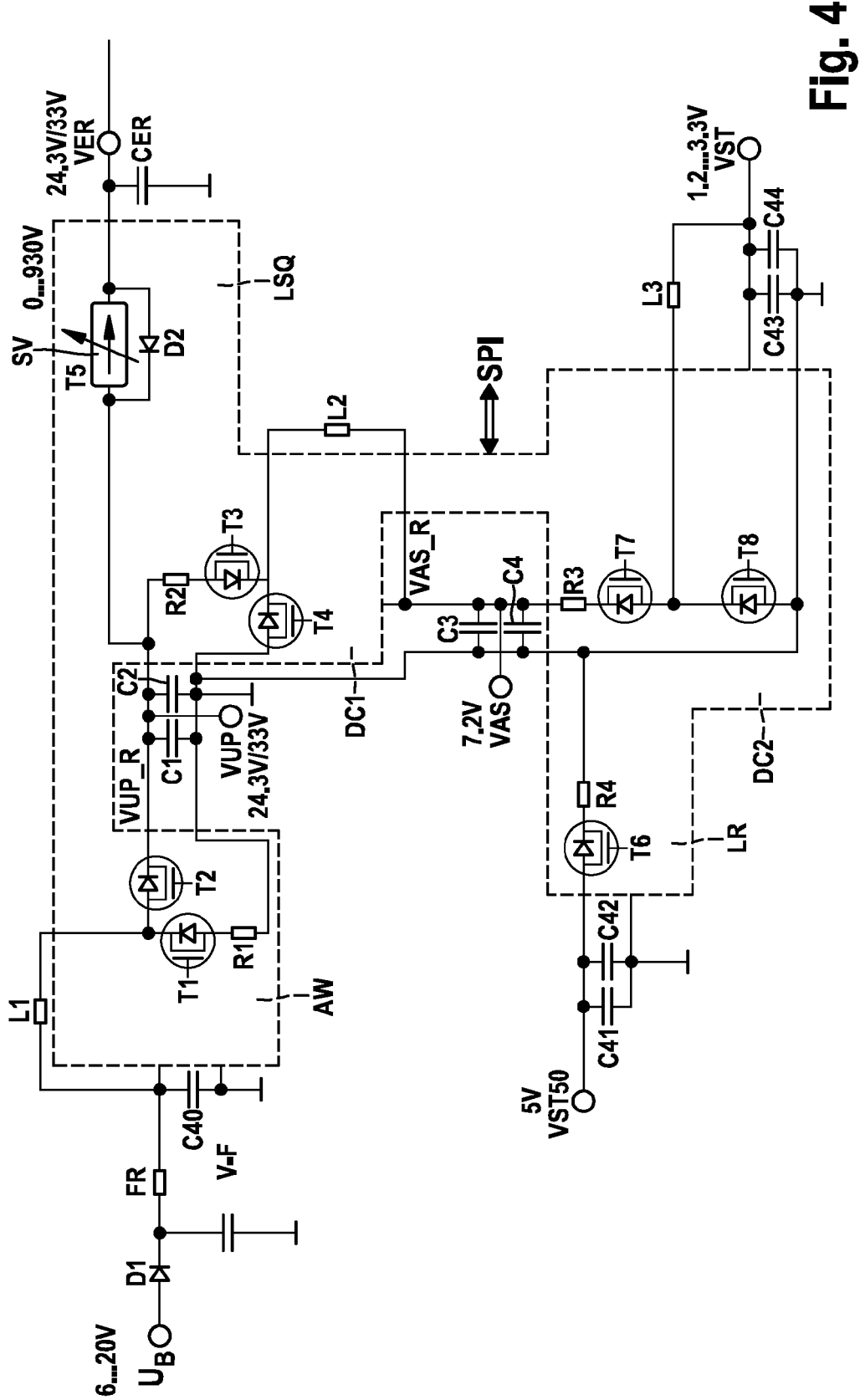
FIG. 4 shows a further block diagram of the control device according to the present invention.

FIG. 4 shows a detailed schematic diagram of components of the control device containing the present invention. Battery voltage UB, which can assume a value between 26 V, is connected to a diode D1 in the direction of flow that acts as a polarity protection. To diode D1 there is connected a V filter V-F having a discharge connection to ground; this relates to capacitor V-F and C40. To the diode and to capacitor V-F there is connected a ferrite FA that is to an input capacitor C40 that is connected to ground and inductor L1 of step-up converter AW, as well as the input of step-up conductor AW with regard to its electronics. Step-up converter AW is integrated, together with step-down converters DC1 and DC2 and a linear controller LR and the charge current source, on a common system ASIC that may also contain further components. This system ASIC can contain the components on a single substrate or on a plurality of substrates.

Step-up converter AW has N-channel charge transistor T1, which is connected via its drain terminals to inductor L1 and via its source terminal to ground via a resistor R1. Moreover, a freewheeling P-channel transistor T2 is present that is connected with its source terminal to the inductor and to transistor T1 (drain) and with its drain terminal to the input of step-up converter controller VUP$_r$. Instead of synchronously controlled transistor T2, a simple ultra-fast freewheeling diode (Schottky diode) may also be used. This diode is connected with its anode to the inductor and to T1 (drain) and with its cathode to VUPr.

The parallel circuit of capacitors C1 and C2 is connected to VUPr. In this parallel circuit, voltage VUP, which is between 22 and 34 V, is tapped. The voltage is for example measured by microcontroller μC. Charge voltage VUP is connected to the input of charge current source LSQ, which has a parallel circuit of current valve SV and a diode D2 connected against the direction of flow, in order to enable a back-flow from capacitor CER, which is connected to the output of charge current source LSQ. A transistor T5 is used as current valve SV. As a rule, diode D2 is a component of transistor T5. Here, a current between 0 and 930 mA can be programmed via the SPI interface. Capacitor CER connected to the output of charge current source LSQ is connected to ground and is also connected to the firing circuit (not shown). However, voltage VUP is accepted not only by charge current source LSQ but also by step-down converter DC1, which converts voltage VUP downward to voltage VAS, namely 7.2 V. Step-down converter DC1 is connected in inverting fashion to step-up converter AW in order to reduce the alternating portion of control voltage VUP.

Via a current shunt R2 in step-down converter DC1, voltage VUP is connected to a subsequently connected charge transistor T3 (P-channel) at its source, and via its drain is connected to inductor L2 of the step-down converter. A further synchronous freewheeling transistor T4 (N-channel) is connected with its source terminal to ground and with its drain terminal to inductor L2 and to the drain of T3. Instead of T4, a simple ultra-fast freewheeling diode (Schottky diode) may also be used. The anode thereof is connected to ground and the cathode is connected to inductor L2 and to the drain of transistor T3. Inductor L2 is connected to the control input of step-down converter DC1, and here forms control voltage VAS$_r$. Here as well, as in the step-up converter, this control input together with the current supply line of L2 is connected to a capacitive load, namely capacitors C3 and C4, which form the output of the step-down converter. Between C3/C4 (+) and the mechanical grounding point, the stepped-down voltage VAS can be tapped. This voltage VAS, of 6.4 V . . . 7.2 V, is in the present case received by step-down converter DC2, which has for this purpose current shunt R3, switching transistors T7 and T8, and inductor L3. DC2 is constructed analogously to DC1. In this way, output voltage VST is formed, which is between 1.2 and 3.3 V and is received by the components in the control device. Via a linear controller LR, connected to step-down converter DC1, the voltage of 5 V is outputted after a current shunt R4 and control transistor T6. This voltage can be used to supply the CAN bus, or FlexRay bus. A capacitive load having capacitors C41 and C44, connected in parallel for reasons of redundancy, is also provided at this output of linear controller LR.

Step-down converter DC2 also has a P-channel charge transistor T7 and an N-channel freewheeling transistor T8, or a freewheeling diode in place of T8. Voltage VAS is connected, via a current shunt R3 in step-down converter DC2, to a subsequently connected charge transistor T7 (P-channel) at the source, and via its drain is connected to inductor L3 of the step-down converter. A further synchronous freewheeling transistor T8 (N-channel) is connected to ground with its source terminal and with its drain terminal is connected to inductor L3 and to the drain of T7. Instead of T8, a simple ultra-fast freewheeling diode (Schottky diode) may also be used. The anode thereof is connected to ground and its cathode is connected to inductor L3 and to the drain of transistor T7.

The output of step-down converter DC2 is also capacitively loaded with the parallel circuit of capacitors C43 and C44. There is thus a series circuit of step-down converters DC1 and DC2, each wired at its output in a manner functionally identical to step-up converter AW, namely capacitively. In addition, all converters are operated in such a way that the alternating portion at the output of the converters is reduced. This results in greater stability.

Figure 5:
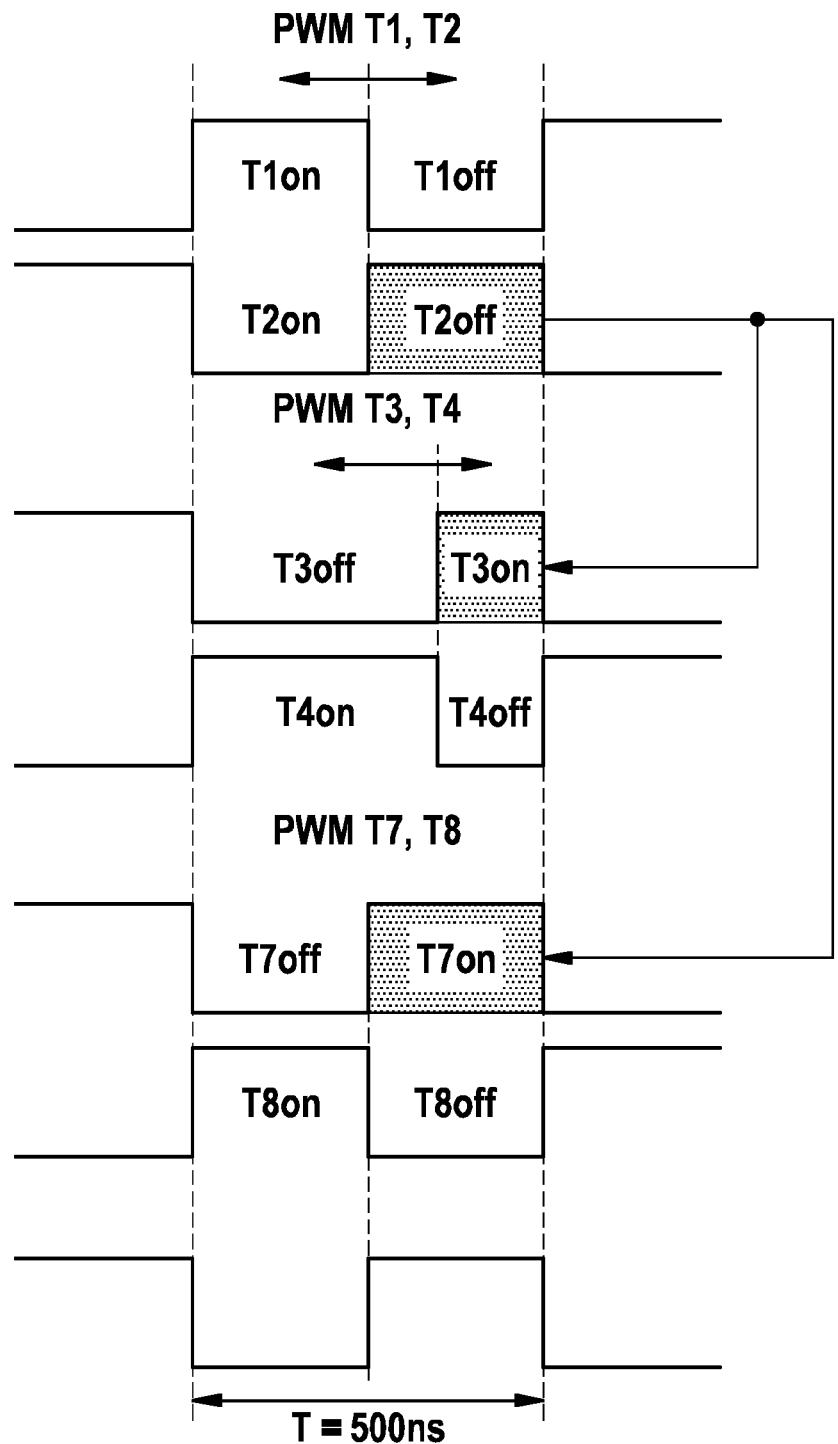
FIG. 5 shows a time diagram for transistors in the switching converters.

FIG. 5 shows the modulation of the transistors of switching converters AW, DC1, and D2. It shows in particular the inverted operation with partial phase coincidence. Here, the upper representation shows the modulation, using pulse-width modulation, of transistors T1 and T2 of step-up converter AW, and shows the transistors are switched on and off. In the first phase, the charge phase can be seen, and in the second phase the freewheeling phase can be seen. The center diagram shows the pulse-width modulation of transistors T3 and T4 of step-down converter DC1, showing a partial coincidence of the charge and freewheeling phases. Here this is precisely reversed; first a freewheeling phase is seen and then a charge phase. In the freewheeling phase of step-up converter AW a discharge of energy via step-down converter DC1 can also be seen. Corresponding to this is the relation of the two step-down converters DC1 and DC2, shown in the center and lower time schemata. In the present case, the clock pulse of the converters is 500 ns. One pulse includes the charge phase and the freewheeling phase.

Figure 6:
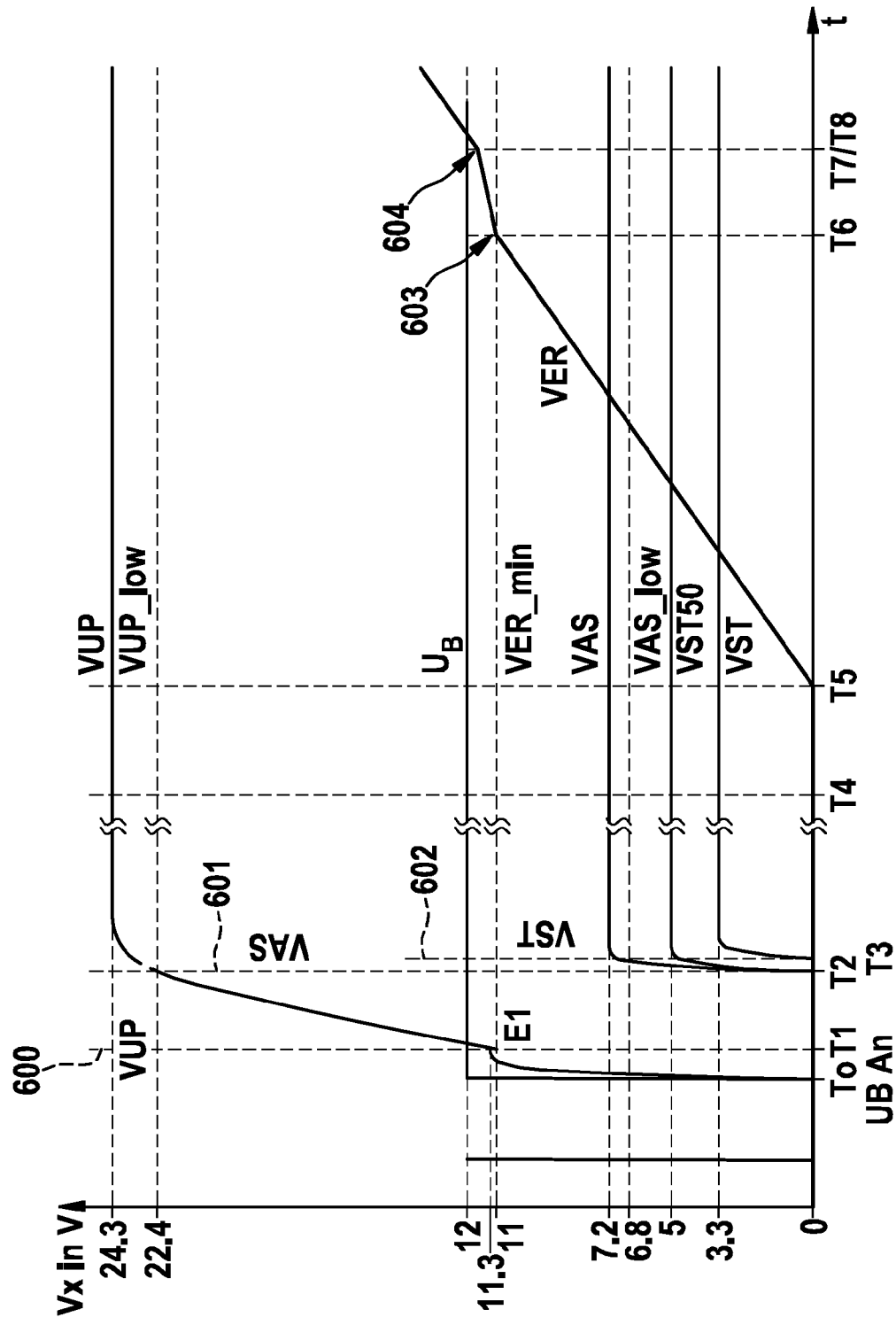
FIG. 6 shows a voltage-time diagram.
Figure 7:
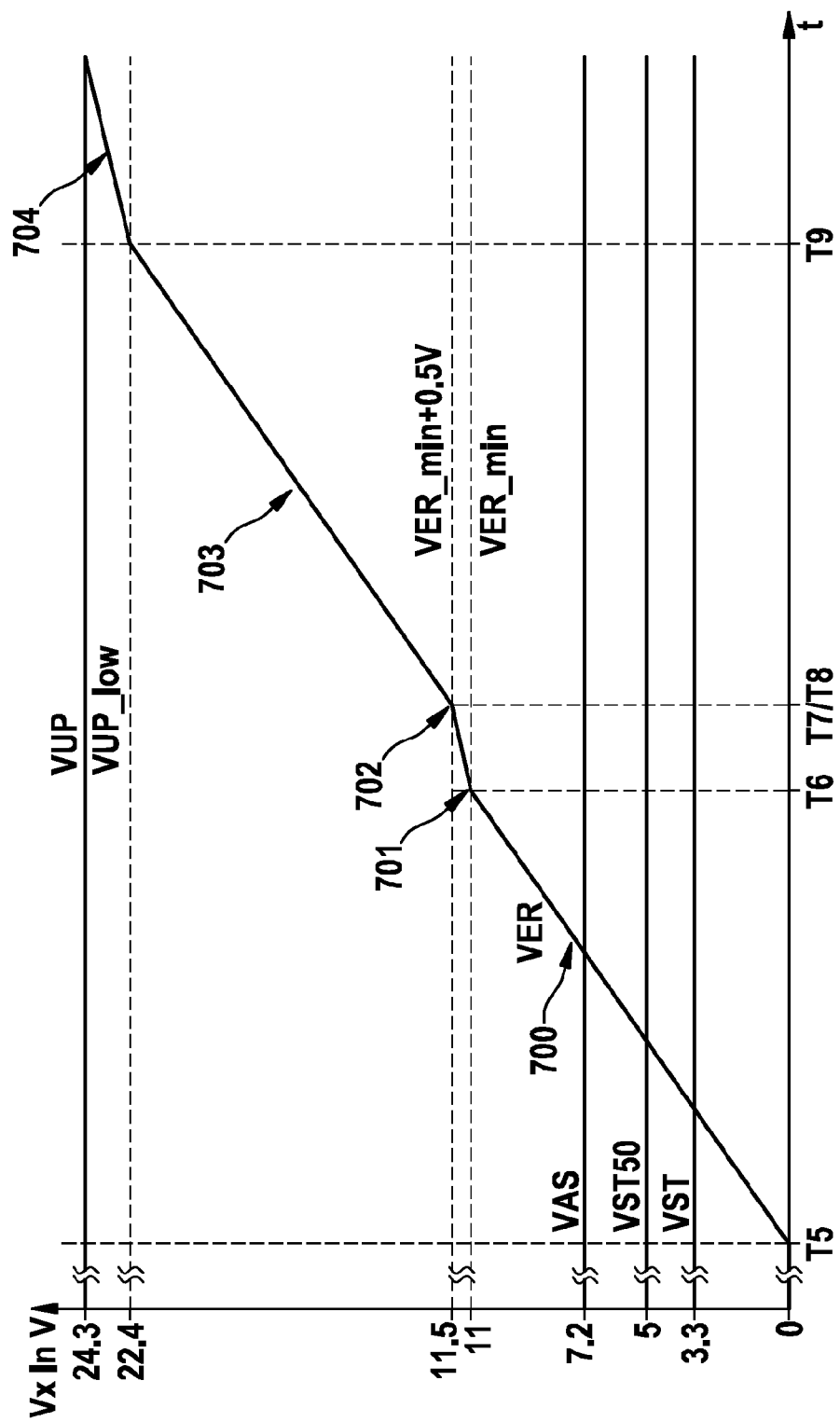
FIG. 7 shows a further voltage-time diagram.

In the following two voltage-time diagrams, FIGS. 6 and 7, the functioning of the circuit according to FIG. 4 is explained in more detail. FIG. 6 shows the voltages from the switching on of battery voltage UB up to the measurement of the equivalent internal resistance of energy reserve CER. FIG. 7 shows the voltage-time diagram from the beginning of the charge phase of energy reserve CER up to the reaching of the control voltage by energy reserve CER.

FIG. 6 shows that the voltage supply is switched on at time T0. This is battery voltage UB, which for example reaches 12 V. The switching converter starts up 600 and outputs voltage VUP at its output. The rise corresponds to the supply impedance of the vehicle, to V-filter V-F of inductor L1, and to capacitive load C1 and C2. In this case, the rise is very fast. At time T1, i.e. approximately 30 to 70 µs after T0, switching converter AW starts, after the buildup of at least two stable ASIC-internal reference voltages and a defined waiting time resulting from a filter. The reference voltages are checked for a difference; i.e. if a difference is present an error is present. The wait time is measured using a counter.

At time T2 step-down converter DC1 also begins to operate, as designated by 601. This takes place as soon as the output voltage of step-up converter VUP>a prespecified value VUP_low. This is recognized by step-down converter DC1 itself.

At time T3, switching controller DC2 also starts, as designated by 602, and linear controller LR also starts as soon as the output voltage of first step-down converter DC1 exceeds a prespecified threshold value VAS_low. At time T4, a power-on reset is initiated after the creation of stable voltages. Vint is an internal voltage from which the reference voltages are formed, and is for example formed from a zener voltage. VRef1 is a so-called band-gap voltage made up of a transistor-emitter voltage and an additive portion for temperature compensation. It corresponds to the bandgap of silicon. Output voltage VAS of the first step-down converter is in a control band and the voltages of linear controller LR and of second step-down converter DC2 are also in a respective control band, after a defined charge time of 2 to 20 ms, determined by a counter. The voltages are monitored by the system ASIC itself, which contains the converters. At time T5 charge current source LSQ is programmed by the microcontroller. The start of the energy reserve charging takes place through a primary current level of for example 210 mA. The voltage at energy reserve VER thus now increases in linear fashion. At time T6, the voltage at energy reserve VER reaches the value VER_min, for example 11V. The primary current level is automatically changed over to a measurement current level of for example 90 mA, and a counter is started with at least 10 bits. At time T7, the voltage reaches the value VER_min+0.5 V. The counter is then stopped. The counter state is stored as a capacitance measurement value until the next power-on reset, and the current level is also changed over for the test of the equivalent internal resistance. This current level is 930 mA.

At time T8, i.e. T7+10 µs, it is checked whether the voltage over energy reserve CER<=VER_min+1 V, and whether this voltage<=VER_min+1.5 V. The decision flags are stored until the next power-on reset; subsequently changeover takes place to the programmed primary current level.

This is also shown in FIG. 7. The primary current level leads to the first rise 700 between times T5 and T6, and the measurement between the capacitance and the equivalent internal resistance takes place between T6 and T8. The second charge phase takes place between T8 and T9, as designated by 703. At time T9, the voltage over energy reserve CER reaches the value VER_low=22.8 V. The current level is automatically set to the programmed maintenance value, for example 60 mA. The voltage over the energy reserve is now brought, with the reduced speed, to the control value of voltage VUP=22.4 V. This is designated by rise 704.

Through the separation of energy reserve CER from step-up converter AW, the airbag supply system is ready for use already at time T4. T4 is from 3 to 21 ms, depending on the definition of the wait time. This permits new functionalities, such as so-called eco-mode. The system executes functions as desired, for example diagnostic communication, without starting the airbag application and without having to reach firing readiness by charging the energy reserve. This can be used for example for service or for a vehicle demonstration, etc.

Through the programming of a suitable primary current level, i.e. the charge current, on the one hand demands can be met for a maximum control device input current while firing readiness is reached, i.e. during the charge phase of the energy reserve, and on the other hand a desired charge time can be achieved depending on the selection of the required energy reserve size.

The capacitance test in this charge phase does not require further measurement sources in addition to the already-present programmable charge current source LSQ. Through the use of two comparator values, VER_min and VER_min+0.5 V, an integrated counter can be used to determine the charge time required to run through the measurement band of 0.5 V. As a measurement current, for example 90 mA is used as a standard. Capacitance CER is accordingly determined by (90 mA×T meas.)/0.5 V); for a measurement time of 102.3 ms this yields 18.4 mF.

The so-called ESR test, i.e. the equivalent internal resistance of the energy reserve, in this charge phase likewise does not require any further measurement sources other than the already-present programmable charge current source LSQ. Through the use of two further comparator values, namely VER_min+1 V and VER_min+1.5 V, it can be determined whether the internal resistance of the energy reserve is sufficiently small. Given a change in measurement current from 90 mA to 930 mA, comparator threshold VER_min+1 V is queried 10 µs after the application of the current current. The µs can be selected, and in the present case are selected so as to compensate the decay of inductive effects without significant capacitive recharging. If this comparator threshold is exceeded, the internal resistance is then more than 0.6Ω. Comparator threshold VER_min+1.5 V is also queried 10 µs after the application of the measurement current. If this threshold is exceeded, the internal resistance is then more than 1.2Ω. This is then a too-high value, and a warning is displayed, such as an illuminated lamp.

Through the feature of the inverted operation of series-coupled converters, corresponding to FIG. 4, in the blocking phase of step-up converter AW it is attempted to bring the coupled step-down converter DC1 at least at times into energy-receiving mode. This measure reduces the alternating portion at the output of step-up converter AW. The same method is used with regard to the coupling of step-down converters DC1 and DC2. Through the feature of inductively decoupled converter output capacitances through corresponding conductor segments, a stable converter-controller item of information containing the change in current can be derived.

Through the feature of a further comparator threshold after the charging of the energy reserve, the comparator threshold being designated VUP_low+0.33 V, a cyclical capacitance measurement of the energy reserve can be carried out. The measurement starts after a read access of the microcontroller to the result register of the cyclical capacitance measurement. The result register is likewise situated on the system ASIC. Through this process, charge current source LSQ is disabled. The voltage decreases due to loads present on voltage VER, such as a voltage divider, a safety switch, etc. If voltage VER reaches the value VER_low, the measurement current, for example 60 mA, is used to recharge the energy reserve until VUP_low+0.33 V is reached. Through the selection of a reduced measurement span and a measurement current correspondingly matched thereto, the resolution remains precisely at the value of the initial capacitance measurement. If the value VER, i.e. the voltage over the energy reserve, reaches the value VER_low+0.33 V, in addition a voltage flag in a measurement value storage device, also situated on the system ASIC, is set to "good." The supply voltage monitoring system supplies the voltages VUP, VER, VAS, VST50, VST to an analog-digital converter of the system ASIC via a multiplexer, so that these values can be read out serially by the microcontroller via the SPI interface.

The present invention also provides an avoiding of measurement errors in the capacitance measurement and the measurement of the equivalent internal resistance of the energy reserve.

These measurement errors are to be avoided in the situation of a breakdown of the battery voltage. For this purpose, in the present case two alternative methods are proposed:
a) Input voltage UB is monitored by a comparator, and if this voltage decreases at least once below a threshold during a running measurement, each running measurement is identified as "not executable" in the measurement storage device.
b) The current controller of charge current source LSQ produces an adjustment status in the measurement application. Only when this status, except for settling times, reaches the same response time as the measurement time itself is the running measurement considered to run without interference and thus to be regarded as valid; otherwise, the measurement value is given a "not executable" identifier in the measurement storage device. In order to acquire the adjustment status, a 10-bit counter having a clock frequency of 5 kHz can again be used; lower resolutions are also conceivable in the present case.

What is claimed is:

1. A control device for operating a safety system for a vehicle, comprising:
a step-up converter which is configured as a switching converter and converts an input voltage derived from a vehicle battery voltage into a higher charge voltage as an output;
at least one energy reserve storage device which is charged by the charge voltage output by the converter for the operation of the safety system in an autarkic mode;
a charge current source connected between the step-up converter and the at least one energy reserve storage device, wherein the charge current source is programmable during operation and defines a charge current for the at least one energy reserve storage device as a function of the programming; and
a logic unit which performs, as a function of at least one electrical parameter at the energy reserve storage device, during the charging of the energy reserve storage device, an initial measurement of a capacitance of the energy reserve storage device, and subsequently performs a measurement of an equivalent internal resistance of the energy reserve storage device.

2. The control device as recited in claim 1, further comprising:
a serial interface configured to provide a connection to a computer to perform the programming.

3. The control device as recited in claim 1, further comprising:
a capacitive load for setting a rise time of the charge voltage output by the step-up converter, wherein the capacitive load is connected to the output of the step-up converter.

4. The control device as recited in claim 1, wherein the logic unit has at least one comparator for a comparison of the at least one electrical parameter with a predetermined threshold, the initial measurement of the capacitance and the subsequent measurement of the equivalent internal resistance being carried out as a function of the comparison of the at least one electrical parameter with the predetermined threshold.

5. The control device as recited in claim 4, wherein the logic unit is configured to cyclically carry out a further measurement of the capacitance of the energy reserve storage device after the charging of the energy reserve storage device.

6. A method for operating a safety system for a vehicle, comprising:
converting, using a step-up converter which is configured as a switching converter of a control device, an input voltage derived from a vehicle battery voltage into a higher charge voltage as an output; and
charging at least one energy reserve storage device using the charge voltage output by the converter for the operation of the safety system in an autarkic mode;
wherein:
a charge current source is connected between the step-up converter and the at least one energy reserve storage device, and the charge current source is programmable during operation and defines a charge current for the at least one energy reserve storage device as a function of the programming;
the charging of the at least one energy reserve storage device by the charge current source takes place in four sequential time segments starting with a first time segment in which the charging is performed with a first current level, followed by a second time segment in which the charging is performed with a test current, a subsequent third time segment in which the charging is performed with the first current level, and a final fourth time segment in which the charging is performed with a second current level below the first current level;
in the second time segment, an initial measurement of a capacitance and of an equivalent internal resistance of the energy reserve storage device takes place; and
the changeover between the first current level and the test current, and the changeover between the first current level and the second current level, take place based on a voltage of the energy reserve storage device.

7. The method as recited in claim 6, wherein the programming is carried out via a serial interface.

8. A method for operating a safety system for a vehicle, comprising:
converting, using a step-up converter which is configured as a switching converter of a control device, an input voltage derived from a vehicle battery voltage into a higher charge voltage as an output; and charging at least one energy reserve storage device using the charge voltage output by the converter for the operation of the safety system in an autarkic mode;
wherein:
a charge current source is connected between the step-up converter and the at least one energy reserve storage device, and the charge current source is programmable during operation and defines a charge current for the at least one energy reserve storage device as a function of the programming; and
the control device is put into an energy-saving mode in that, after ramping up to the charge voltage, the charge current source remains disabled, so that no charging of the at least one energy reserve storage device takes place, and a computer of the control device is supplied with electrical energy by at least one step-down converter connected to the output of the step-up converter.

* * * * *